A. TORRIANI

Oct. 2, 1928. THERMOELECTRIC HEATER Re. 17,093

Original Filed Nov. 27, 1925

Inventor

Angelo Torriani

By B. Singer, Atty.

Reissued Oct. 2, 1928.

Re. 17,093

UNITED STATES PATENT OFFICE.

ANGELO TORRIANI, OF PAVIA, ITALY.

THERMOELECTRIC HEATER.

Original No. 1,651,644, dated December 6, 1927, Serial No. 71,854, filed November 27, 1925, and in Italy December 15, 1924. Application for reissue filed February 18, 1928. Serial No. 255,453.

This invention refers to thermo-electric apparatus intended for heating fluid masses generally and has for its subject matter a thermo-electric heater which, owing to the basic principle of its construction, secures the highest efficiency thus far reached and that is practically attainable with this kind of apparatus.

It is well known that the transmission of heat between two solid masses facing one another and the condition of the physico-chemical nature of said masses being the same essentially depends upon the distance between the surface of the heat transmitting mass and the surface of the heat receiving mass and also upon the medium interposed between the two surfaces.

If the said distance is considerable, the heat transmission is affected by radiation and convection through the fluid medium generally occupying the space between the two surfaces, but the transmission never takes place by conductivity which, as is well known, is the best method of heat transmission.

In all apparatus heretofore known for the object specified above, this inconvenience is found in a high degree; their heat transmission coefficient accordingly is very low, to the detriment of thermal efficiency and consequently also of the total efficiency of the thermo-electric generator.

The thermo-electric heater according to the invention, instead, is based on the principle of causing the electric portion of the heater to work independently of any air contact and causing it to give off its thermal energy to the outer portion of the apparatus by forced contact.

The apparatus according to the invention is characterized by the fact that electric resistances are embedded in any preferred manner in a heat transmission mass which, when cold, is just in contact with an outer envelope extending all over the inner surface of said mass, this envelope being plunged into the fluid mass to be heated, whereas the heat transmission mass when in a hot condition, owing to thermal expansions of different intensity or degree, forcibly bears against the said envelope and forces out the interposed thin layer of air, thus realizing in a complete manner a thermal transmission by conductivity.

The invention is illustrated in one constructional form in the annexed drawing, wherein.

Figure 1:
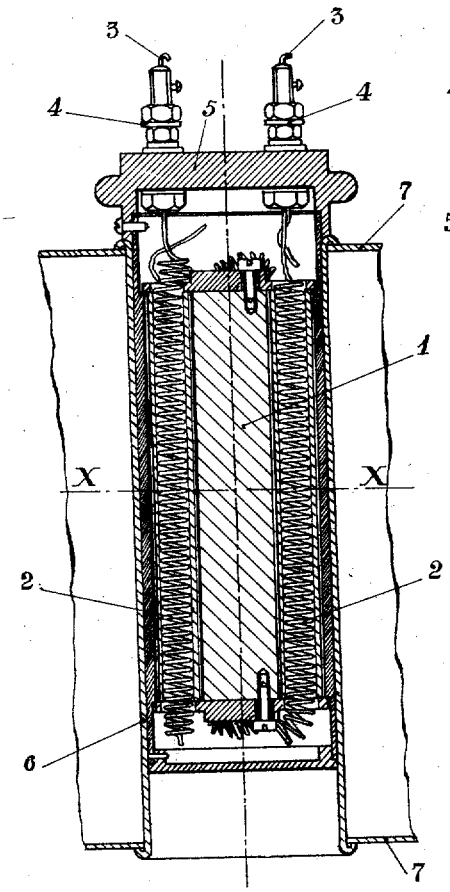
Figs. 1 and 2 are respectively a central longitudinal section and a cross section on the line —*x*—*x*—, showing a thermo-electric heater according to the invention in connection with a special heating device.
Figure 3:
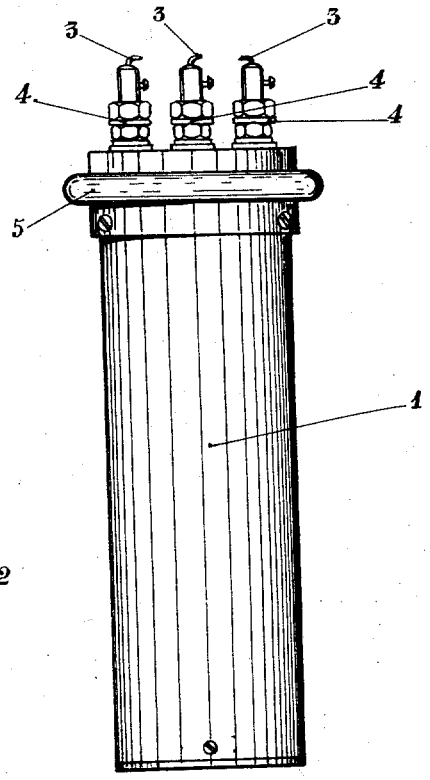
Figures 3 and 4 are respectively an elevation and a plan view from above of the heater shown in Figures 1 and 2.
Figure 2:
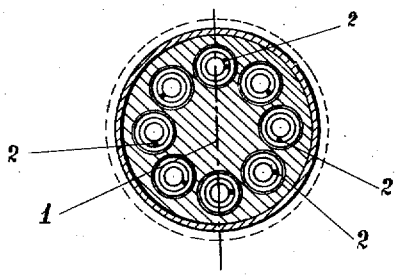
Figure 4:
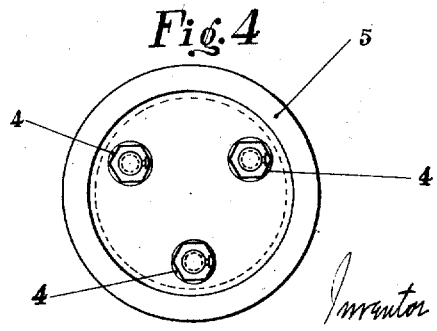

The thermo-electric heater comprises a body part —1— in which are embedded the spiral resistances —2— connected to the line conductors —3— through terminals —4— secured to the cap —5— of the body —1—.

The body is an exact fit in the envelope —6— into which it is inserted, the envelope —6— being secured in any convenient manner to the vessel —7— containing the fluid to be heated. Under the action of the current the resistances —2— become hot and warm up the mass —1— which accordingly expands and increases in cross section and owing to this increase it bears against the inner surface of the envelope —6— and forces out any air that may be interposed between the two adjacent surfaces.

Although I have described a preferred embodiment of my invention in detail, it is to be understood that my invention is by no means limited to the detailed construction illustrated and described, but has the full breadth and scope of the following claims.

What I claim and desire to secure by United States Letters Patent is:

1. A thermo-electric candle for heating fluid masses, in which a plurality of spiral resistances are used, lodged each in a recess of its own formed in a heat transmission mass, this heat transmission mass being an accurate fit in an outer envelope secured to the walls of the vessel in which the fluid to be heated is contained, so that when said resistances are energized, said mass of material is caused by the thermal expansion to come in forcible contact with said envelope.

2. In a thermo-electric heater as claimed in claim 1, in which a plurality of spiral resistances are used and lodged each in a recess of its own formed in the heat transmission mass, this heat transmission mass being an accurate fit in an outer envelope secured to the walls of the vessel in which the fluid to be heated is contained.

3. In a thermoelectric apparatus, a heat transmission mass, a resistance element associated therewith and an envelope surrounding said mass, said mass having a greater intensity of thermal expansion than said envelope so that when heated by said element, said mass is caused to expand and come in forcible contact with said envelope.

4. In a thermo-electric apparatus, an outer sheath, a heat transmission mass adapted to fit closely within said sheath, said mass having a greater rapidity of thermo expansion than said sheath, a resistance element within said mass causing said mass to expand to insure a complete thermal conductive relation between said mass and said sheath.

5. In a thermo-electric apparatus, a cylindrical sheath, a cylindrical heat transmission mass adapted to fit closely within said sheath, said mass having a greater coefficient of thermal expansion than said sheath, a resistance element within said mass for causing said mass to expand and prevent the formation of air pockets between said mass and said sheath.

In testimony whereof, I have signed my name to this specification this 1st day of Feb. 1928.

ANGELO TORRIANI.